US 6,564,233 B1

(12) United States Patent
Fleischman

(10) Patent No.: US 6,564,233 B1
(45) Date of Patent: May 13, 2003

(54) SERVER CHAINING SYSTEM FOR USENET

(75) Inventor: Robert M. Fleischman, Concord, NH (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/465,616

(22) Filed: Dec. 17, 1999

(51) Int. Cl.$^7$ .............................................. G06F 17/30
(52) U.S. Cl. ........................ 707/203; 707/511; 345/356
(58) Field of Search .............................. 707/1, 7, 511, 707/203; 345/356

(56) References Cited

U.S. PATENT DOCUMENTS

| | | | |
|---|---|---|---|
| 5,557,798 A | 9/1996 | Skeen et al. ................. 395/650 |
| 5,572,643 A | 11/1996 | Judson ........................ 395/793 |
| 5,657,390 A | 8/1997 | Elgamal et al. ............... 380/49 |
| 5,706,507 A | 1/1998 | Schloss ....................... 395/615 |
| 5,737,619 A | 4/1998 | Judson ........................ 395/761 |
| 5,768,578 A | 6/1998 | Kirk et al. ................... 395/611 |
| 5,799,304 A | * 8/1998 | Miller ............................ 707/7 |
| 5,801,702 A | 9/1998 | Dolan et al. ................. 345/357 |
| 5,805,824 A | 9/1998 | Kappe .................... 395/200.72 |
| 5,822,434 A | 10/1998 | Caronni et al. ............... 380/49 |
| 5,825,890 A | 10/1998 | Elgamal et al. ............... 380/49 |
| 5,848,415 A | 12/1998 | Guck .......................... 707/10 |
| 5,862,325 A | 1/1999 | Reed et al. ............ 395/200.31 |
| 5,877,757 A | 3/1999 | Baldwin et al. ............. 345/336 |
| 5,877,759 A | 3/1999 | Bauer ......................... 345/339 |
| 5,878,233 A | 3/1999 | Schloss ................. 395/200.55 |
| 5,881,131 A | 3/1999 | Farris et al. .................. 379/27 |
| 5,893,911 A | 4/1999 | Piskiel et al. ................. 707/911 |
| 5,899,995 A | 5/1999 | Millier et al. ............... 707/102 |
| 5,905,863 A | * 5/1999 | Knowles et al. ............. 345/356 |
| 5,905,866 A | 5/1999 | Nakabayashi et al. . 395/200.53 |

OTHER PUBLICATIONS

Gschwind, T., "A Cache Architecture for Modernizing the Usenet Infrastructure," Distributed Syst. Group, Tech. Univ. Wien Austria, System Sciences, Jan. 5, 1999, pp. 1–9.*
Kowalchuk et al., "vnews: A Multicast, Multimedia News Service with Virtual Messages," IEEE, pp. 44–50.*
Gschwind et al., "NewsCache—A High Performance Cache Implementation for Usenet News," 1999 USENIX Annual Technical Conf., Jun. 6, 1999, www.infosys.tuwien.ac.at/NewsCache/.*
Assange et al., "What is NNTPCache?" www.nntpcache.org, printed on Dec. 16, 2001.*

Primary Examiner—Charles L. Rones
(74) Attorney, Agent, or Firm—Fulbright & Jaworski LLP

(57) ABSTRACT

A chaining system for Usenet applications allows local Usenet servers having a relatively small storage capacity to provide access to a large number of articles through network connections with large-capacity storage devices. The local servers can thereby advertise the availability of the union of its own stored content and the content stored on the large-capacity storage device. Chaining can be accomplished with and without-caching. In addition, the chaining system of the present invention allows storage devices to be staged throughout a network so that the most requested Usenet articles are available on fast, local servers, thereby freeing larger storage devices to hold greater numbers of less-popular articles. The larger devices may be shared among several local servers. The overall system performance is enhanced because the load on storage devices can be advantageously balanced, with the fastest (and typically smallest) storage devices absorbing the greatest load, while the slower (and typically larger) storage devices have reduced load and offer a larger selection of less-popular news articles. The net result for the user is a system with a large selection of articles in which most of the requests will be served quickly from local storage devices.

13 Claims, 4 Drawing Sheets

U.S. PATENT DOCUMENTS

| | | | |
|---|---|---|---|
| 5,911,776 A | 6/1999 | Guck | 709/210 |
| 5,915,249 A | 6/1999 | Spencer | 707/5 |
| 6,157,930 A * | 12/2000 | Ballard et al. | 707/203 |
| 6,266,667 B1 * | 7/2001 | Olsson | 707/10 |
| 6,366,933 B1 * | 4/2002 | Ball et al. | 707/511 |
| 2001/0011264 A1 * | 8/2001 | Kawasaki | 707/1 |
| 2001/0054084 A1 * | 12/2001 | Kosmynin | 709/218 |
| 2002/0009058 A1 * | 1/2002 | Kelly et al. | 370/316 |
| 2002/0032735 A1 * | 3/2002 | Burnstein et al. | 709/204 |

* cited by examiner

SERVER CHAINING SYSTEM FOR USENET

BACKGROUND OF THE INVENTION

1. Field of the Invention

The present invention relates to computer hardware and software, and more particularly to a system and method for chaining news servers for Usenet operations.

2. Description of the Prior Art

Usenet is a worldwide collaboration network of servers that support newsgroups. There are many thousands of newsgroups, each covering a particular topic of interest to users. Each server administrator can decide which newsgroups to support, usually based on the requests of the local users who wish to read and contribute material to particular groups. Postings to newsgroups can consist of any form of digital data, but are referenced herein generically as "articles."

In contrast to the World Wide Web, Usenet is a forum that allows many people to collaborate with many of their peers in the same interest group. Instead of a single user downloading a website, a Usenet participant can observe a thread of discussion from many different people. When a Usenet participant posts material, that article will similarly be accessible to each of the participants in the newsgroup.

Usenet is also distinguishable from e-mail transmissions and chat rooms. Newsgroups allow readers to choose their topics of interest. Unwanted articles and messages do not clutter mail in-boxes. As people respond to messages, those responses get added below the prior messages to form a stream of discussion (also called a "thread" of discussion).

When a new article is posted on a newsgroup, the originating server sends a copy of the article to each networked server that has requested "newsfeeds" in that particular newsgroup. Since Usenet is a worldwide network, it is possible that a new article could be copied thousands of times and migrate to distant servers. Usenet is generally transmitted using a protocol called NNTP (Network News Transfer Protocol). Special newsreaders are required to post, distribute, and retrieve Usenet articles. Newsreaders are widely available in freeware, shareware, and commercial versions, and are included in certain versions of Microsoft Internet Explorer and Netscape Navigator.

Internet Service Providers (ISPs) have been under popular pressure to provide access to Usenet. The volume of news feeds to servers has increased dramatically, resulting in difficult technological challenges to maintain appropriate levels of service to users. High performance servers are now required, along with innovative algorithms, in order to handle the volume of articles that are posted on the various newsgroups.

One of the difficult challenges relates to a system and method for archiving articles. With the explosive growth of Usenet, relatively large amounts of disk space are required to store new articles generated for a particular newsgroup. The archival period for some newsgroups may be a period of only a few days, since large volumes of postings are submitted on a daily basis. Users will be unable to retrieve older articles because such articles will have been purged from the server to make room for more recent submissions.

Usenet servers are limited by the amount of computer storage that is available for Usenet articles. The growth of Usenet has made it difficult to offer both a wide variety of newsgroups and a long archival period for each newsgroup. Instead, each server administrator must be selective about the content that will be offered to users.

Due to cost constraints, many Internet Service Providers (ISPs) prefer to install local servers with a limited storage capacity. Most users will be interested in the latest articles within the most popular newsgroups which are stored on the local servers. Inevitably, certain users of the small-capacity servers will desire access to content that is not available locally, but might otherwise be available on another large-capacity server. The present invention overcomes the limitations of small-capacity servers by making them appear to users as if the server contained the union of articles stored locally and on the large-capacity server. As used herein, the terms union and intersection are given their mathematical meanings as applied to set theory.

SUMMARY OF THE INVENTION

The present invention is a system and method for connecting a high storage capacity server to several lower storage capacity servers. The lower storage capacity servers will appear to have the archival capacity of the union of themselves and the high storage capacity server. In this manner, an Internet Service Provider can locate multiple small servers in proximity to its users, while advertising the availability of a larger number of articles than could otherwise be stored on the local servers.

As will be described further herein, the chaining system of the present invention allows storage devices to be staged throughout a network so that the most requested Usenet articles are available on fast, local servers, thereby freeing larger storage devices to hold greater numbers of less-popular articles. The larger storage devices may be shared among several local servers. The overall system performance is enhanced because the load on storage devices can be advantageously balanced, with the fastest (and typically smallest) storage devices absorbing the greatest load, while the slower (and typically larger) storage devices have a reduced load and offer a larger selection of less-popular news articles. The net result for the user is a system with a large selection of articles in which most of the requests will be served quickly from local storage devices.

According to the present invention, the numerous small storage capacity servers can store a small archive of news articles comprising the latest, or most popular news articles. However, those users desiring an older or less popular article will have seamless access to the larger archive. The end result is a higher-performance system capable of serving the needs of numerous users. Subscribers to ISPs will gain the benefit of having access to a larger number of news articles.

In one example, a local news server may support an archive of one week of the latest posting in a particular newsgroup. The larger-capacity remote server may store two months of articles from the same news group. A user connected to the local server will have access to the entire range of articles from both servers. Since the latest posting is typically the most popular among users, the local server will bear the heaviest load, but its corresponding speed will still provide good service to users. In contrast, the remote server is likely to have a slower response time to requests due to its larger size, but the server will have a lighter load because of the less popular nature of its content. The overall system performance will be improved over earlier Usenet architectures in terms of speed and quality of articles available to users.

In another example, a local news server may only have enough storage capacity to support one dozen active newsgroups. Many thousands of newsgroups exist within Usenet, and there may be local subscribers to the server that wish to access less popular newsgroups that are not stored locally on the server. Under the present invention, the user will have access to the newsgroups that are stored on the larger server.

The present invention involves chaining two servers together for the purpose of offering a larger variety of newsgroups and articles to end users. The two servers can be described as a master machine and slave machine. The slave machine may contain a relatively small library of Usenet articles, whereas the master machine has a relatively large library. Under the present invention, the slave machine can advertise the availability of articles contained in the union of itself and the master machine. The user may or may not be informed that most of the content is stored remotely on the master machine. In the event that the user requests an article that is not resident locally on the slave, the article is retrieved from the master machine.

Each newsgroup has a name, and within each newsgroup the individual articles are indexed. If the newsgroup is stored wholly within a single server, then the indexing function can be performed locally. If the newsgroup is stored on more than one server, synchronization of the numbers is required so that like articles can be similarly identified on each server. Number synchronization can be accomplished in several ways, but in general the result is that each new article in a newsgroup is assigned a unique and permanent identifier. Typically, these identifiers are numerical and sequential. However, any form of unique identification scheme can be equivalently employed.

Chaining requires number synchronization whenever the same newsgroups exist on both the master server and the slave server. The sequence of synchronization numbers, or other index identifier, on each server is herein called a "range." Chaining is accomplished through on-the-fly merges of ranges. For example, a newsgroup may have the most recent thousand articles available on a slave machine, whereas the next older nine thousand articles will be stored on the master machine. To the end user, it appears that the slave machine has ten-thousand articles.

Synchronization can be accomplished in several ways. For example, all news articles in a particular newsgroup could be routed through a master server where they are indexed. The master may retain certain articles and pass other articles to designated slave machines. Alternatively, servers that are chained together can be fed by the same source so that the servers can coordinate the retention range for each newsgroup. In yet another alternative, news articles may be fed to slave machines, wherein older articles in the slave are sent for archival to the master, with the slave retaining only the most recent articles for local availability.

The present invention can also be practiced by linking a small, local server to more than one larger server. Such a configuration is herein called split chaining. The advantage of split chaining is that larger archives of news articles can be offered to end users. For example, a large archive of several news groups can stored on a first server, while another large archive of different news groups can be stored on a second server. A small local server can be chained to both larger servers to provide access to the sum of the archives of the two larger servers. Split chaining can also be accomplished when two larger servers have overlapping newsgroups, however it will be important to have an article synchronization scheme to keep track of the location of various articles.

BRIEF DESCRIPTION OF THE DRAWINGS

A more complete understanding of the present invention can be obtained by considering the following detailed description of the preferred embodiments thereof in conjunction with the accompanying drawings, in which.

DETAILED DESCRIPTION OF THE INVENTION

Figure 1:
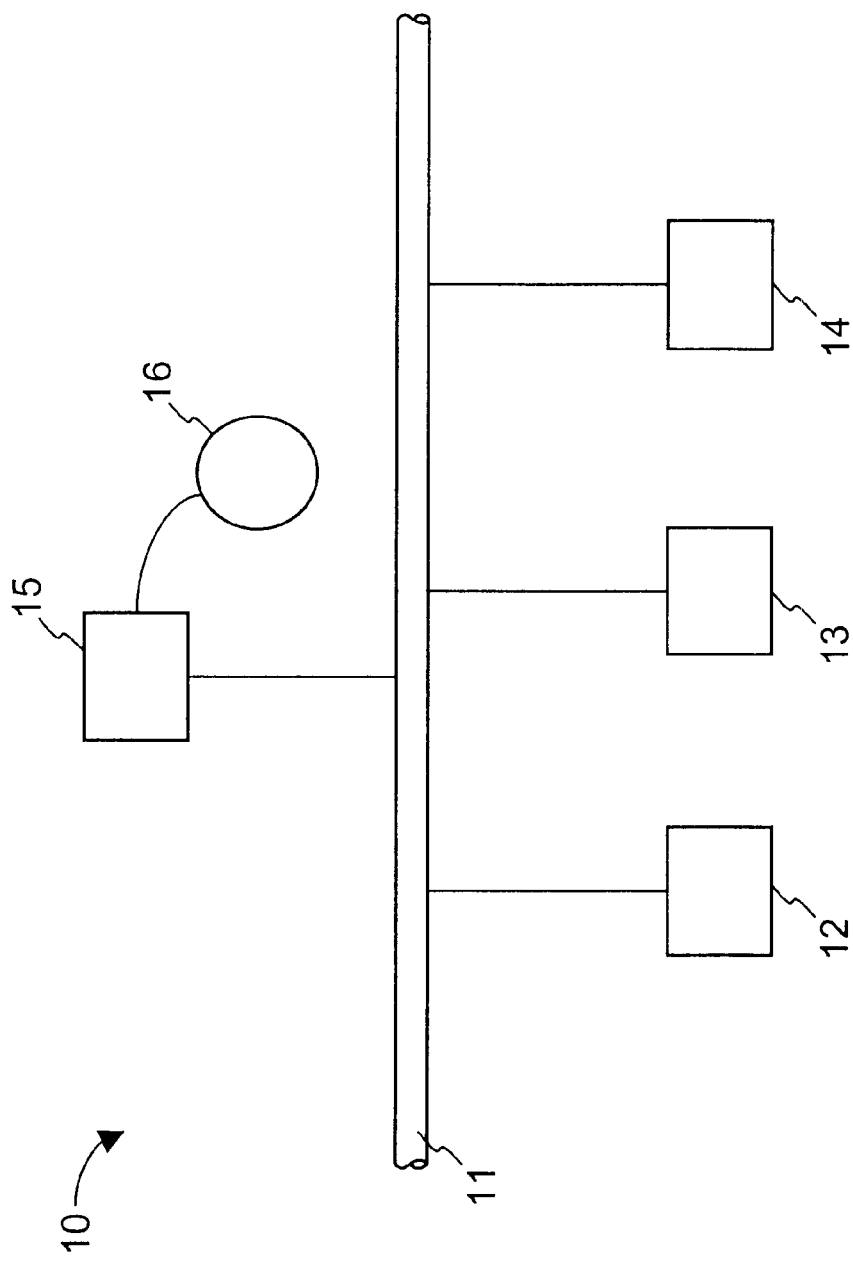
FIG. 1 is a schematic diagram of prior Usenet storage systems.

In prior systems, shown generally as 10 in FIG. 1, a server (such as a Network File System (NFS) server) with a relatively large computer storage device 16 was networked with several Usenet servers 12, 13, and 14. One or more newsgroups would be stored within device 16 and made available to users through local servers 12, 13, and 14. In the architecture of FIG. 1, the storage device 16 saw heavy loads as a result of multiple requests from servers 12, 13, and 14, thereby resulting in slow access time. Alternatively, each local server could have its own storage device, however the number of articles available to users would be limited by the storage capacity of the individual server.

As Usenet has grown, there are many more, and varied, newsgroups. In addition, many newsgroups have become very popular and generate numerous articles per day. Even as the cost of storage has gone down, the quantity of articles has skyrocketed, leaving each Usenet service provider with large costs for disk storage. In addition, users have become more demanding about service delays associated with file transfers. Systems with fast data access are more desirable.

Figure 2:
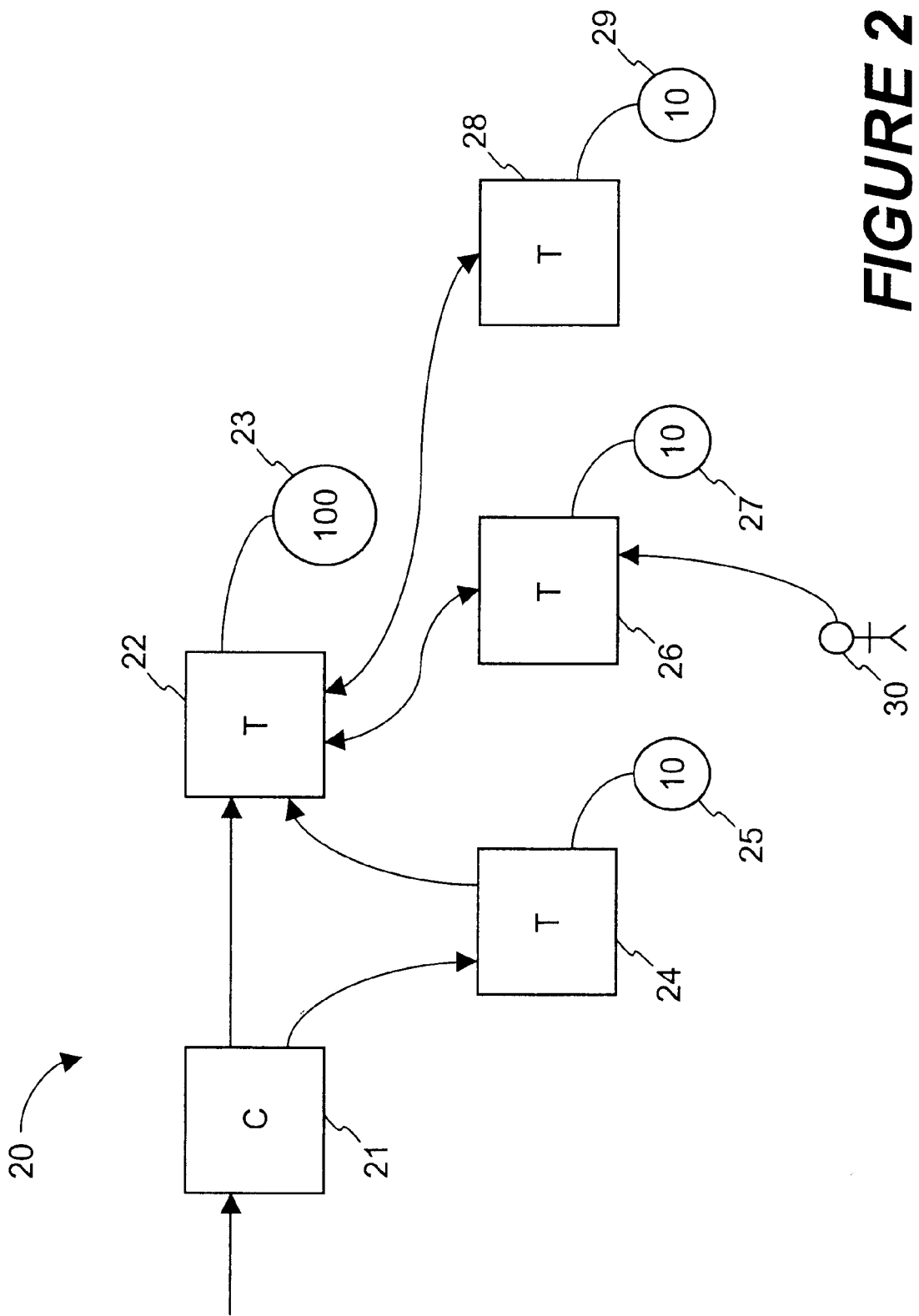
FIG. 2 is a schematic diagram of a chaining system according to the present invention.

Older style Usenet server systems have been improved by the present invention as shown in FIG. 2. A Usenet server system with chaining is shown generally by 20. Two different types of servers are shown: a Cyclone server (designated by a capital C) and a Typhoon server (designated by a capital T), both available from bCandid Corporation of Boulder, Colo. The particular server is designated only for purposes of showing a preferred embodiment, but practitioners will recognize that the claimed invention can be equivalently implemented on many different types of servers Referring again to FIG. 2, Cyclone server 20 has a Usenet feed which is shown schematically by an incoming arrow. Cyclone 20 does not store any articles, but merely functions as a router to Typhoon servers 22 and 24. Each Typhoon server may have differently sized storage devices. For example, Typhoon 24 is shown with a 10 GB storage device 25, whereas Typhoon 22 may have a 100 GB storage device as shown by 23. The actual size of the storage device is chosen for purposes of illustration. Devices with a terabyte of storage are known to be used in the field.

Typically, larger storage devices have slower access times, and are therefore more suitable for archival purposes. It would be desirable to keep a relatively light load on the larger storage devices to prevent long delays associated with access times. For that reason, it is desirable to have a faster (and typically smaller) storage device connected to a local server, such as servers 24, 26, and 28.

The most popular articles would ideally be located on the local servers 24, 26, and 28 to handle a large portion of the user load. Each of the servers 24, 26, and 28 are shown with 10 GB servers which are labeled 25, 27, and 29. Users, such as shown by 30, are connected through their ISP to a local server such as 26. The server 26 can advertise to user 27 the availability of the union of news articles stored in devices 27 and 23. The arrangement is similar for servers 24 and 28, each of which can advertise the availability of its own content along with the content in device 23.

Preferably, the most popular news articles for the users of servers 24, 26, and 28 are stored in their respective local storage devices 25, 27 and 29. That arrangement results in faster access times for users, as well as reduced loads on the larger storage device 23.

The Cyclone 21 has a synchronization feature that assigns unique and sequential numbers to each article within a newsgroup. Synchronization is preferred whenever articles from a newsgroup are stored in different locations. This saves storage capacity by reducing duplicative storage of articles.

Depending upon the particular configuration of the network, the Cyclone may be programmed to route articles from a particular news group to Typhoon 22, and articles from the same or other newsgroups would be sent to Typhoon 24. Due to the architecture of the system 20, the server 22 will ideally receive content that has archival interest to all three servers 24, 26, and 28. Server 24 may also receive content, such as particular newsgroups, that will be offered uniquely to its users.

Server 22 may also be used to feed the latest articles from particular newsgroups to servers 26 and 28. The synchronization of the articles makes it possible to route and retrieve articles, as appropriate. Archival news articles can be transferred from the local servers 26 and 28 back to the archival server 22.

Figure 3:
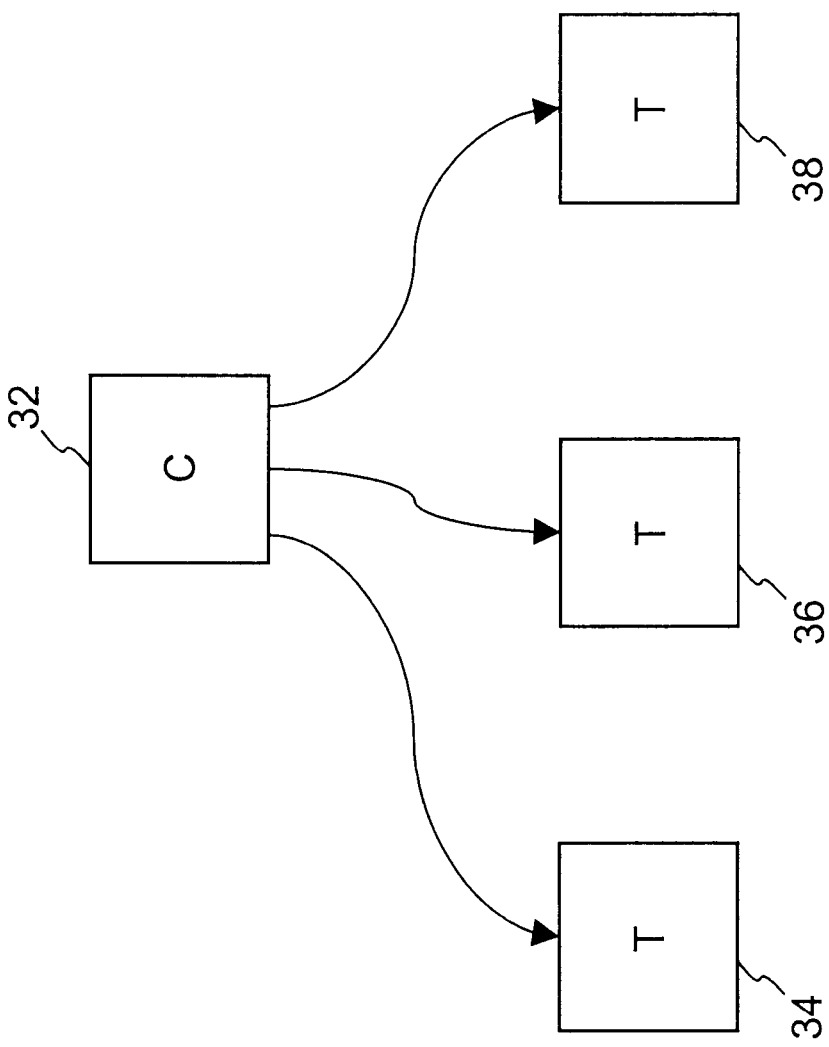
FIG. 3 is a schematic diagram of a synchronization system according to the present invention.
Figure 4:
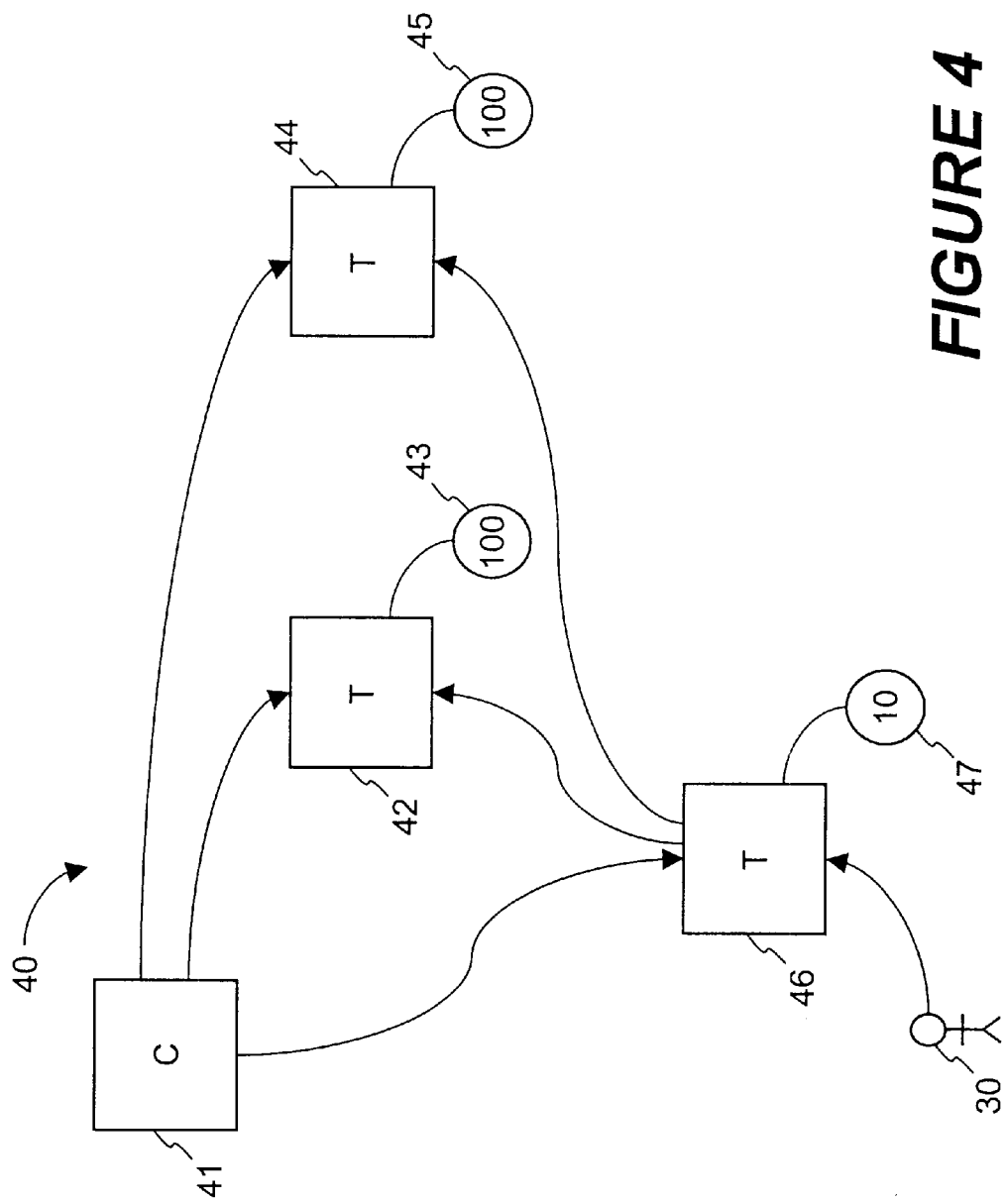
FIG. 4 is a schematic diagram of a split chaining system according to the present invention.

FIG. 3 shows a simplified architecture that can be used to further illustrate the concept of synchronization. Cyclone server 32 indexes and routes incoming news articles to Typhoon servers 34, 36, and 38. Each of the servers 34, 36, and 38 can thereby identify the range of articles within each newsgroup that is stored locally. In addition, the servers can inform each other of their locally stored content. Servers that do not support certain newsgroups can retrieve those newsgroups from other servers. Also, when two servers provide the same newsgroup, older articles that may not be available on a small server can be retrieved from another server with a larger archive of articles. Chaining can refer to a simple, linear architecture in which older articles are stored on an archival server that is linked to a local server, as in FIG. 2. However, the concept of chaining can be extended to include more complex architectures such as shown in FIG. 4. Local server 46 can be chained to both server 42 and server 44. Server 46 will advertise the availability of the union of content stored on devices 47, 43, and 45. This type of architecture is herein referenced as "split chaining" because there may be more than one source on which to locate archival articles.

It is important to distinguish the present invention from the concept of caching. The present invention can employ chaining with and without caching. Under a chaining system with caching, articles that are transmitted from the larger server are cached by the smaller server under the assumption that any requested article is likely to be requested again by other users. By caching each requested article, the load on the larger server can be reduced and the access times to the articles can be increased. After a period of time, the cached copy of the article is replaced by other requested articles.

Under a chaining system without caching, a requested article is transmitted from the larger server and is delivered to the user, and is not stored locally by the smaller server. Without caching, the smaller server does not have to assign storage to less popular articles. The downside of this system is that other users who may request the same article will also have to retrieve it from the larger server. In many cases, larger storage devices require longer access times so that a request for an archived article will not be fulfilled as quickly as other similar requests for content that is stored on the smaller, faster storage devices of the local server.

It will be apparent to those of skill in the appertaining arts that various modifications can be made within the scope of the above invention. Accordingly, this invention is not to be considered limited to the specific examples or embodiments chosen for the purposes of disclosure, but rather to cover all changes and modifications which do not constitute departures from the permissible scope of the present invention. Having thus described our invention, what is desired to be secured and covered by Letter Patent is presented in the appended claims.

What is claimed is:

1. A system for storing Usenet articles, comprising:
    a first server connected to a first digital storage device containing a first range of Usenet articles;
    a second server connected to a second digital storage device containing a second range of Usenet articles that does not include Usenet articles that are contained in said first range of Usenet articles, wherein said second server maintains synchronization of identifiers of said first range of Usenet articles and said second range of Usenet articles;
    wherein said second server is chained to said first server, and further wherein said first server advertises the availability of the union of said first range and said second range.

2. The system of claim 1, wherein said first range is within a first newsgroup and said second range is within a second newsgroup.

3. The system of claim 1, wherein said first range and said second range are articles within a single newsgroup.

4. The system of claim 1, further comprising a first plurality of newsgroups stored within said first digital storage device, and a second plurality of newsgroups stored within said second digital storage device, and wherein an intersection of newsgroups between said first plurality and said second plurality are synchronized.

5. A system for split chaining Usenet servers, comprising:
    a first server connected to a first digital storage device containing a first range of Usenet articles;
    a second server connected to a second digital storage device containing a second range of Usenet articles that does not include Usenet articles that are contained in said first range of Usenet articles, wherein said second server maintains synchronization of identifiers of said first range of Usenet articles and said second range of Usenet articles; and
    a third server connected to a third digital storage device containing a third range of Usenet articles that does not contain Usenet articles that are contained in said first range of Usenet articles and said second range of Usenet articles,
    wherein said first server is chained to said second server, and said first server is also chained to said third server, and further wherein said first server advertises the availability of the union of said first range, second range, and third range.

6. The system of claim 5, wherein said first range comprises articles within a first newsgroup and said second range comprises articles within a second newsgroup.

7. The system of claim 5, wherein said first range and said second range contain articles within a single newsgroup.

8. The system of claim 5, further comprising a first plurality of newsgroups stored within said first digital storage device, and a second plurality of newsgroups stored within said second digital storage device, and wherein an intersection of newsgroups between said first plurality and said second plurality are synchronized.

9. A method for storing Usenet articles, comprising:

connecting a first server to a first digital storage device containing a first range of Usenet articles;

connecting a second server to a second digital storage device containing a second range of Usenet articles that does not include Usenet articles that are contained in said first range of Usenet articles;

chaining said second server to said first server, wherein said chaining includes synchronizing identifiers associated with said first range of Usenet articles and said second range of Usenet articles at said second server;, and advertising, on said first server, the availability of the union of said first range and said second range.

10. The method of claim 9, wherein said first range comprises Usenet articles within a first newsgroup and said second range comprises articles within a second newsgroup.

11. The method of claim 9, wherein said first range and said second range comprise articles within a single newsgroup.

12. The method of claim 9, further comprising the step of synchronizing an intersection of newsgroups between a first plurality of newsgroups stored within said first digital storage device, and a second plurality of newsgroups stored within said second digital storage device.

13. The method of claim 9, further comprising the step of split chaining by also chaining a third server to said first server, wherein said third server is connected to a third digital storage device and contains Usenet articles, and the first server further performs the step of advertising the availability of at least one article stored within said third digital storage device.

* * * * *